(12) United States Patent
Zhu

(10) Patent No.: US 12,561,135 B2
(45) Date of Patent: Feb. 24, 2026

(54) CROSS-PLATFORM PLUG-IN DEVELOPMENT METHODS, APPARATUSES, AND ELECTRONIC DEVICES

(71) Applicant: ALIPAY (HANGZHOU) INFORMATION TECHNOLOGY CO., LTD., Hangzhou (CN)

(72) Inventor: Sijie Zhu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 271 days.

(21) Appl. No.: 18/477,173

(22) Filed: Sep. 28, 2023

(65) Prior Publication Data

US 2024/0296047 A1 Sep. 5, 2024

(30) Foreign Application Priority Data

Mar. 3, 2023 (CN) .......................... 202310209641.7

(51) Int. Cl.
*G06F 8/76* (2018.01)

(52) U.S. Cl.
CPC ..................................... *G06F 8/76* (2013.01)

(58) Field of Classification Search
CPC ....................................................... G06F 8/76
See application file for complete search history.

(56) References Cited

U.S. PATENT DOCUMENTS

2010/0138816 A1* 6/2010 Mokrani ................... G06F 8/41
717/143
2022/0214894 A1* 7/2022 Cai ....................... G06F 3/0487

2022/0317981 A1* 10/2022 Yu ............................. G06F 8/60
2022/0360504 A1* 11/2022 Kairali ................ H04L 41/0816
2023/0221975 A1* 7/2023 Sommers ............ G06F 9/45558
718/1
2023/0334227 A1* 10/2023 East ...................... G06F 9/4498

FOREIGN PATENT DOCUMENTS

CN 110134371 A * 8/2019 .............. G06F 8/20
CN 113626023 A * 11/2021 .............. G06F 8/34
CN 114329045 A * 4/2022

OTHER PUBLICATIONS

NPL_CN 110134371 A_English Translation (Year: 2019).*
NPL_CN 113626023 A_Engilsh_ Translation (Year: 2022).*
NPL_CN 114329045 A_English Translation (Year: 2021).*

* cited by examiner

*Primary Examiner* — Ziaul A Chowdhury
(74) *Attorney, Agent, or Firm* — Fish & Richardson P.C.

(57) ABSTRACT

Cross-platform plug-in development is described. Cross-platform plug-in development includes acquiring a plug-in template corresponding to a plurality of integrated development environments, where the plug-in template includes pre-compiled execution code adapted to running environments corresponding to the plurality of integrated development environments. Service code is acquired, where the service coded is related to a service corresponding to a service plug-in developed for a target integrated development environment based on the plug-in template and where the service code is code developed based on a common development language supported by each of the plurality of integrated development environments. After the service code is filled into the plug-in template, the plug-in template is compiled to obtain the service plug-in corresponding to the target integrated development environment.

18 Claims, 4 Drawing Sheets

Acquire a plug-in template corresponding to a plurality of integrated development environments, where the plug-in template includes pre-compiled execution code that is adapted to running environments corresponding to the plurality of integrated development environments — S110

Acquire service code related to a service corresponding to a service plug-in that is developed for a target integrated development environment based on the plug-in template, where the service code is code developed based on a common development language that is supported by each of the plurality of integrated development environments — S120

After the service code is filled into the plug-in template, compile the plug-in template to obtain the service plug-in corresponding to the target integrated development environment — S130

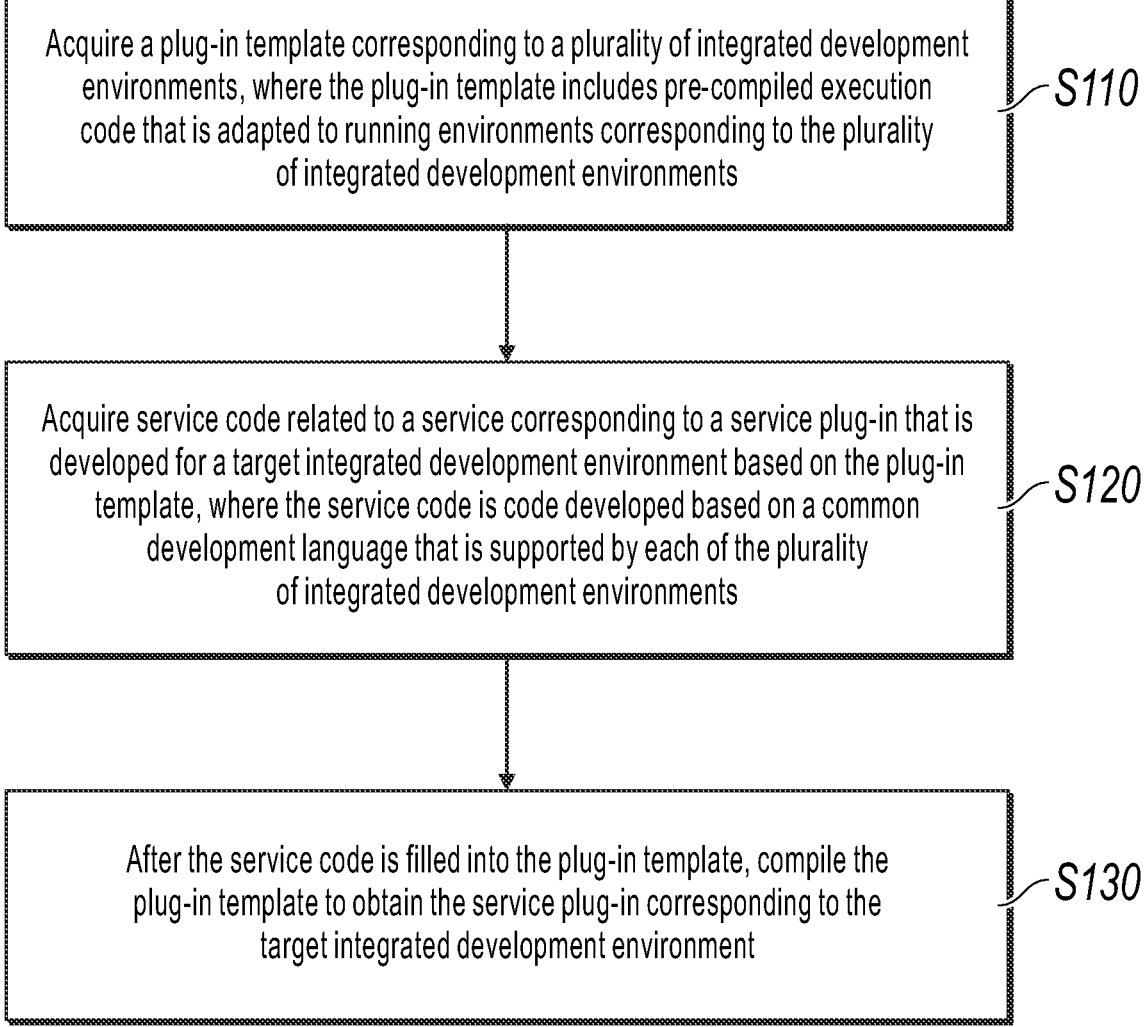

Acquire a plug-in template corresponding to a plurality of integrated development environments, where the plug-in template includes pre-compiled execution code that is adapted to running environments corresponding to the plurality of integrated development environments

S110

Acquire service code related to a service corresponding to a service plug-in that is developed for a target integrated development environment based on the plug-in template, where the service code is code developed based on a common development language that is supported by each of the plurality of integrated development environments

S120

After the service code is filled into the plug-in template, compile the plug-in template to obtain the service plug-in corresponding to the target integrated development environment

CROSS-PLATFORM PLUG-IN DEVELOPMENT METHODS, APPARATUSES, AND ELECTRONIC DEVICES

CROSS-REFERENCE TO RELATED APPLICATIONS

This application claims priority to Chinese Patent Application No. 202310209641.7, filed on Mar. 3, 2023, which is hereby incorporated by reference in its entirety.

TECHNICAL FIELD

This application pertains to the field of computer technologies, and specifically relates to cross-platform plug-in development methods, apparatuses, and electronic devices.

BACKGROUND

Since different integrated development environments use different development languages and running environments, when developing plug-ins for a plurality of integrated development environments, plug-ins having the same function also need to be repeatedly and respectively developed for different integrated development environments, thereby causing a huge waste of human resources.

SUMMARY

In view of the above-mentioned description, this application provides cross-platform plug-in development methods, apparatuses, and electronic devices, so as to alleviate a problem that plug-ins having the same function need to be repeatedly and respectively developed for different integrated development environments, thereby causing a huge waste of human resources.

Specifically, this application is implemented using the following technical solutions:

According to a first aspect, a cross-platform plug-in development method is provided, where the method is applied to a plug-in development program; the plug-in development program is used to develop plug-ins for a plurality of supported integrated development environments that have different running environments; and the plug-in development program performs the following method to develop a plug-in for any target integrated development environment in the plurality of integrated development environments: acquiring a plug-in template corresponding to the plurality of integrated development environments, where the plug-in template includes pre-compiled execution code that is adapted to the running environments corresponding to the plurality of integrated development environments; acquiring service code related to a service corresponding to a service plug-in that is developed for the target integrated development environment based on the plug-in template, where the service code is code developed based on a common development language that is supported by each of the plurality of integrated development environments; and after the service code is filled into the plug-in template, compiling the plug-in template to obtain the service plug-in corresponding to the target integrated development environment.

Optionally, the execution code includes communication code that supports a plurality of communication protocols corresponding to the running environments of the plurality of integrated development environments, and application programming interface code that supports an application programming interface corresponding to the running environments of the plurality of integrated development environments.

Optionally, the service code includes interface code that is adapted to an interaction interface corresponding to the plurality of integrated development environments, and service logic code that is used to invoke the application programming interface corresponding to the running environments of the plurality of integrated development environments.

Optionally, the plug-in template is a multi-layer architecture, which includes an interface layer, a service logic layer, a communication layer, and an application programming interface layer; the interface layer, the service logic layer, and the application programming interface layer are all communicatively connected to the communication layer, and the interface layer includes the interface code; the service logic layer includes the service logic code; the communication code is pre-compiled in the communication layer to provide an application programming interface that is respectively bound to communication software development kits of different communication protocols; and the application programming interface code is pre-compiled in the application programming interface layer to provide application programming interfaces corresponding to different services.

Optionally, the interface code is compiled using HTML, CSS, and JS languages.

Optionally, sending the plug-in template to the target integrated development environment so as to invoke the execution code in a running environment corresponding to the target integrated development environment to run the service code includes: compiling the plug-in template based on a compilation method corresponding to the target integrated development environment to obtain the service plug-in corresponding to the target integrated development environment.

Optionally, the compiling the plug-in template based on a compilation method corresponding to the target integrated development environment includes: selecting target execution code adapted to a running environment of the target integrated development environment from the pre-compiled execution code that is adapted to the running environments corresponding to the plurality of integrated development environments and that is included in the plug-in template.

Optionally, the plurality of integrated development environments include a JetBrains integrated development environment and a VSCode integrated development environment.

Optionally, the plug-in development program includes a service plug-in that runs on a plug-in development platform and that is configured to provide a plug-in development service for the plurality of integrated development environments.

According to a second aspect, a cross-platform plug-in development apparatus is provided, including: a first acquisition module, configured to acquire a plug-in template corresponding to a plurality of integrated development environments, where the plug-in template includes pre-compiled execution code that is adapted to running environments corresponding to the plurality of integrated development environments; a second acquisition module, configured to acquire service code related to a service corresponding to a service plug-in that is developed for any target integrated development environment in the plurality of integrated development environments based on the plug-in template, where the service code is code developed based on a common development language that is supported by each of the plurality of integrated development environments; and a packaging module, configured to: after the service code is filled into the plug-in template, compile the plug-in template to obtain the service plug-in corresponding to the target integrated development environment.

According to a third aspect, a computer-readable storage medium is provided, where the computer-readable storage medium stores a computer program, and the program is executed by a processor to implement the steps of the method in the first aspect.

According to a fourth aspect, an electronic device is provided, including a memory, a processor, and a computer program that is stored in the memory and that can run on the processor, where the processor executes the program to implement the steps of the method in the first aspect.

In some embodiments of this application, a plug-in template including pre-compiled execution code that is adapted to running environments corresponding to the plurality of integrated development environments is used such that when developing a service plug-in for a target integrated development environment, a developer only needs to write service code based on a common development language that is supported by each of the plurality of integrated development environments, and the developer only needs to send the plug-in template that is filled with service code to the target integrated development environment to load a service plug-in with a specific function in the target integrated development environment. The developer no longer needs to specifically develop plug-ins corresponding to different integrated development environments, thereby reducing repeated development, greatly improving plug-in development efficiency, and reducing numerous development time costs and human resources.

BRIEF DESCRIPTION OF DRAWINGS

FIG. 1 is a schematic flowchart illustrating a cross-platform plug-in development method, according to some example embodiments of this application;

DESCRIPTION OF EMBODIMENTS

Figure 2:
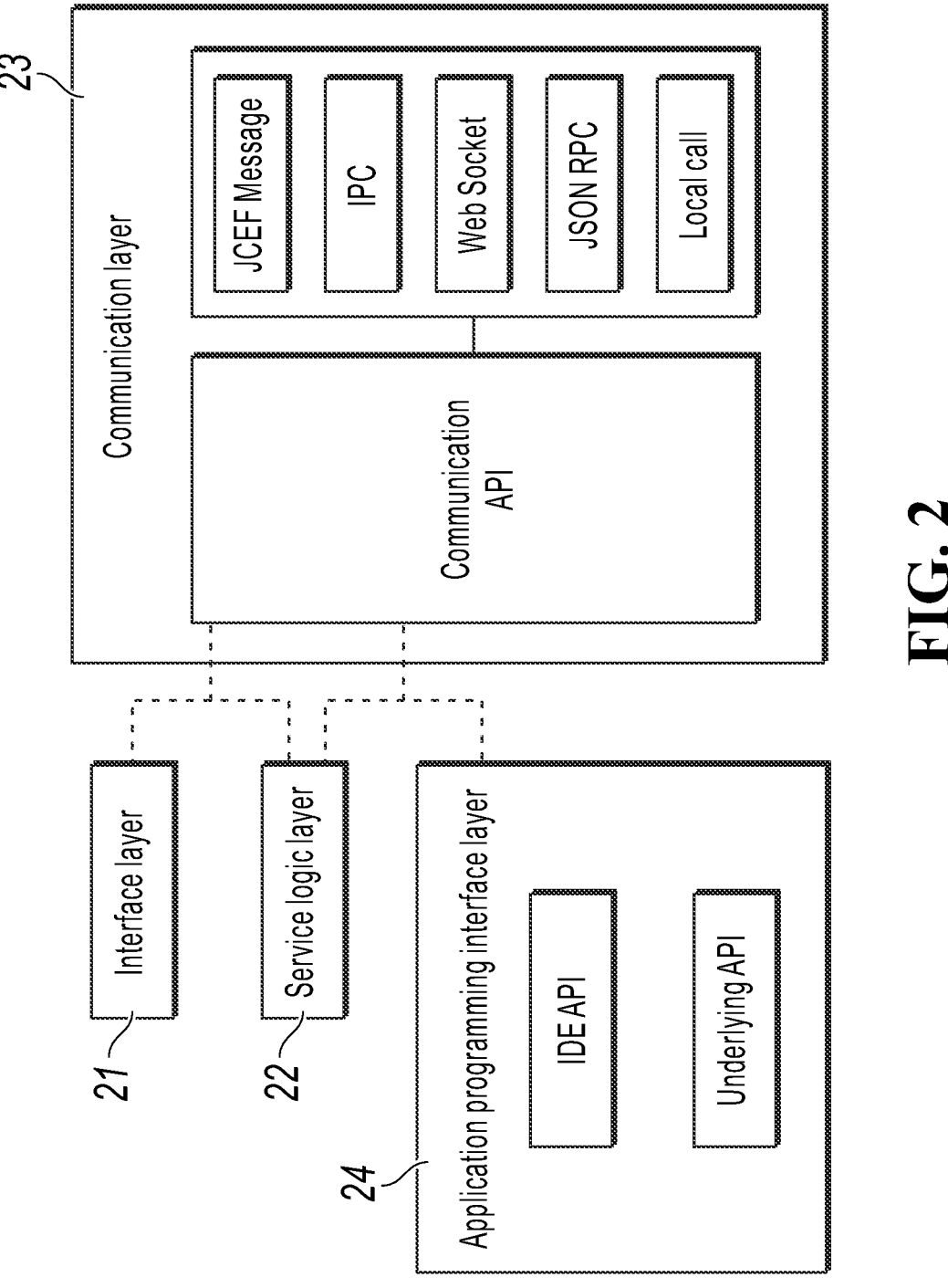
FIG. 2 is a schematic architectural diagram illustrating a plug-in template, according to some example embodiments of this application.

Some example embodiments are described in detail here, and examples of the example embodiments are presented in the accompanying drawings. When the following description relates to the accompanying drawings, unless specified otherwise, the same numbers in different accompanying drawings represent same or similar elements. Implementations described in the following example embodiments do not represent all implementations consistent with this application. On the contrary, the implementations are merely examples of apparatuses and methods that are described in the appended claims in detail and consistent with some aspects of this application.

The terms used in this application are for the purpose of describing some specific embodiments only, and are not intended to limit this application. The terms "a" and "the" of singular forms used in this application and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", etc. may be used in this application to describe various types of information, the information should not be limited to the terms. These terms are merely used to differentiate between information of the same type. For example, without departing from the scope of this application, first information can also be referred to as second information, and similarly, the second information can also be referred to as the first information. Depending on the context, the word "if" used here can be interpreted as "when" or "while" or "in response to determining".

Different integrated development environments (IDE), such as a JetBrains integrated development environment and a VSCode integrated development environment, correspond to different running environments. The running environment corresponding to the integrated development environment can include a development language, a communication protocol, an application programming interface, etc.

When a service plug-in with a specific function is developed for the integrated development environment, since different integrated development environments correspond to different running environments, service plug-ins with the specific function need to be respectively developed for different integrated development environments, wasting numerous time costs and human resources.

In view of the above-mentioned description, this specification provides a cross-platform plug-in development method. A unified plug-in template corresponding to a plurality of integrated development environments is used, execution code that is adapted to the running environments corresponding to the plurality of integrated development environments is pre-compiled in the plug-in template, and then service-related service code written by a user based on a common development language that is supported by each of the plurality of integrated development environments is filled into the plug-in template. As such, a service plug-in applicable to the plurality of integrated development environments can be obtained.

During implementation, the plug-in development program first acquires a plug-in template corresponding to a plurality of integrated development environments, where the plug-in template includes pre-compiled execution code that is adapted to running environments corresponding to the plurality of integrated development environments; acquires service code related to a service corresponding to a service plug-in that is developed for a target integrated development environment based on the plug-in template, and fills the obtained service code into the plug-in template; and then sends the plug-in template to the target integrated development environment so as to invoke the execution code in a running environment corresponding to the target integrated development environment to run the service code.

In the above-mentioned technical solutions, a plug-in template including pre-compiled execution code that is adapted to running environments corresponding to the plurality of integrated development environments is used such that when developing a service plug-in for a target integrated development environment, a developer only needs to write service code based on a common development language that is supported by each of the plurality of integrated development environments, and the developer only needs to send the plug-in template that is filled with service code to the target integrated development environment to load a service plug-in with a specific function in the target integrated development environment. The developer no longer needs to specifically develop plug-ins corresponding to different integrated development environments, thereby reducing repeated development, greatly improving plug-in development efficiency, and reducing numerous development time costs and human resources.

To make a person skilled in the art understand the technical solutions in this application better, the following clearly and comprehensively describes the technical solutions in some embodiments of this application with reference to the accompanying drawings in some embodiments of this application.

References are made to FIG. 1. FIG. 1 shows a cross-platform plug-in development method provided in some embodiments of this application. The method can be applied to a plug-in development program, and the plug-in development program is used to develop plug-ins for a plurality of supported integrated development environments that have different running environments.

It is worthwhile to note that, the plug-in development program can be a program or a plug-in development platform that is used to develop plug-ins for a plurality of integrated development environments that have different running environments, can be a plug-in development program provided by any integrated development environment in the plurality of integrated development environments, or can be a plug-in development program provided by another integrated development environment. The plug-in development program can alternatively include a service plug-in that runs on a plug-in development platform and that is configured to provide a plug-in development service for the plurality of integrated development environments. The plug-in development platform can load the service plug-in to implement the plug-in development method described in some embodiments of this application.

It is worthwhile to note that, the plug-in development method in some embodiments of this application can be used to develop plug-ins for a plurality of integrated development environments, and the plurality of integrated development environments can be predetermined based on actual needs, for example, can include a JetBrains integrated development environment and a VSCode integrated development environment, or can be a cloud development environment (Cloud IDE).

The plug-in development program performs the following steps to develop a plug-in for any target integrated development environment in the plurality of integrated development environments.

S110: Acquire a plug-in template corresponding to the plurality of integrated development environments, where the plug-in template includes pre-compiled execution code that is adapted to the running environments corresponding to the plurality of integrated development environments.

When a developer develops a plug-in, if service plug-ins that have the same function and implement the same service may need to be developed for a plurality of integrated development environments that have different running environments during the current plug-in development, then the developer can acquire a plug-in template corresponding to the plurality of integrated development environments in advance. The plug-in template can include pre-compiled execution code that is adapted to the running environments corresponding to the plurality of integrated development environments.

The plurality of integrated development environments corresponding to the plug-in template can be set based on actual needs, for example, can include a JetBrains integrated development environment and a VSCode integrated development environment. Corresponding plug-in templates can be set for different combinations of integrated development environments. For brevity, the JetBrains integrated development environment and the VSCode integrated development environment are used as examples for illustrative description in the following embodiments.

There can be a variety of methods for acquiring the plug-in template. For example, the method can be pre-compiling code related to the plug-in template, including execution code that is adapted to the running environments corresponding to the plurality of integrated development environments. For another example, in some implementations, the plug-in development program can include a service plug-in that runs on a plug-in development platform and that is configured to provide a plug-in development service for the plurality of integrated development environments, and the service plug-in is loaded on a specific plug-in development platform to acquire a plug-in template corresponding to the plurality of integrated development environments.

The execution code included in the plug-in template can include related code that supports running of the compiled service plug-in in the running environments of the plurality of integrated development environments.

Various modules inside different integrated development environments may use different communication protocols for information transmission. For example, for the JetBrains integrated development environment, a communication protocol based on Java Chromium Embedded Framework (JCEF) Message can be used. For the VSCode, the Inter-Process Communication (IPC) protocol can be used. For the cloud IDE, the WebSocket protocol can be used. To ensure that the developed service plug-in is applicable to any target integrated development environment in the plurality of integrated development environments, the plug-in template needs to include communication code that supports a plurality of communication protocols corresponding to the running environments of the plurality of integrated development environments. The communication code can internally provide a unified communication API and a unified communication protocol. The unified communication API can be bound to software development kits (SDK) corresponding to different communication protocols.

The running environments of different integrated development environments may provide different application programming interfaces (API), which can specifically include IDE APIs and underlying APIs provided by the integrated development environments. The IDE APIs can include a terminal API, an editor API, a file tree API, etc. The underlying APIs can include a file system API, a network API, an operating system API, etc. To ensure that the developed service plug-in is applicable to any target integrated development environment in the plurality of integrated development environments, and can invoke an application programming interface of the target integrated development environment, the plug-in template needs to include application programming interface code that supports an application programming interface corresponding to the running environments of the plurality of integrated development environments. The application programming interface code can perform unified API abstraction on the application programming interface corresponding to the running environments of the plurality of integrated development environments to provide an IDE API and an underlying API with the same function.

It can be understood from the above-mentioned description that, the plug-in template can include pre-compiled communication code and application programming interface code, where the communication code is used to eliminate a difference in the communication protocols between the running environments of the plurality of integrated development environments, and the application programming interface code is used to eliminate a difference between an IDE API and an underlying API that are provided by the running environments of the plurality of integrated development environments such that when developing a plug-in for any target integrated development environment in the plurality of integrated development environments, the developer only needs to provide service execution logic independent of the target integrated development environment.

S120: Acquire service code related to a service corresponding to a service plug-in that is developed for the target integrated development environment based on the plug-in template, where the service code is code developed based on a common development language that is supported by each of the plurality of integrated development environments.

The plug-in development program acquires service code related to a service corresponding to a service plug-in that is developed by the developer for the target integrated development environment based on the above-mentioned plug-in template. The service code is code related to service logic that is independent of the running environment corresponding to the target integrated development environment.

Since the service code is independent of the running environment corresponding to the target integrated development environment, the developer can write the service code by using a common development language that is supported by each of the plurality of integrated development environments.

Different integrated development environments can use different interaction interfaces. For example, for the Jet-Brains integrated development environment, an interaction interface based on a built-in JCEF can be used. For the VSCode integrated development environment, an interaction interface based on Electron can be used, which can be basically equivalent to an interaction interface based on a Chromium Embedded Framework (CEF) and Node.js. The Cloud IDE can run in a browser. It can be understood that bottom layers of the above-mentioned interaction interfaces are all chrome kernels. To be applicable to interaction interfaces corresponding to different integrated development environments, the service code can include interface code that is adapted to an interaction interface corresponding to the plurality of integrated development environments. The common development language used to write the interface code can be set based on actual needs. For example, for the above-mentioned interaction interfaces that use the chrome kernel, the interface code can be written using a HyperText Markup Language (HTML), a Cascading Style Sheets (CSS) language, and a JavaScript (JS) language.

To ensure that after user interaction information is acquired using an interaction interface, invoking between the interaction interface and each of the IDE API and the underlying API, and related logic processing are implemented based on the user interaction information, the service code can further include logic code that is used to invoke the application programming interface corresponding to the running environments of the plurality of integrated development environments. The common development language used to write the logic code can be set based on actual needs. For example, the logic code can be written using the JavaScript language, or using languages such as C++, Go, and Python.

S130: After the service code is filled into the plug-in template, compile the plug-in template to obtain the service plug-in corresponding to the target integrated development environment.

After obtaining the plug-in template and the service code, the plug-in development program can fill the service code in the plug-in template so as to complete writing of the plug-in code for the service plug-in. Then, a compilation operation can be performed, based on the compilation method corresponding to any target integrated development environment in the plurality of integrated development environments, on the plug-in template that includes the plug-in code, so as to obtain the service plug-in corresponding to the target integrated development environment. Then, the service plug-in can be sent to the target integrated development environment for loading, or the service plug-in can be uploaded to a plug-in market corresponding to the target integrated development environment, and users download the service plug-in based on their needs and load the service plug-in into the target integrated development environment so as to invoke the execution code in the running environment corresponding to the target integrated development environment to run the service code, to implement a related function of the service plug-in in the target integrated development environment.

It is worthwhile to note that an execution sequence of steps S110 and S120 can be set based on actual needs. Step S110 can be first performed to acquire the plug-in template, then step S120 is performed to acquire the service code, and then the service code is filled into the plug-in template. When step S120 is performed, the service code can be directly written in an area corresponding to the plug-in template based on the plug-in template. Alternatively, step S120 can be first performed to acquire the service code, then step S110 is performed to acquire the plug-in template, and then the service code is filled into the plug-in template. Since the service code written by the user may not necessarily conform to the plug-in template, the service code can be adjusted when the service code is filled into the plug-in template. For brevity, an example in which step S110 is performed before step S120 is used for illustrative description in the following embodiments.

An architecture used by the plug-in template can be diverse, can be determined based on the running environments of the plurality of integrated development environments applicable to the plug-in template, or can be determined based on a function implemented by the service plug-in. For example, in some implementations, the plug-in template can be a multi-layer architecture. As shown in FIG. 2, the plug-in template can include an interface layer 21, a service logic layer 22, a communication layer 23, and an application programming interface layer 24.

The communication code is pre-compiled in the communication layer such that the communication layer can provide an application programming interface that is respectively bound to communication software development kits of different communication protocols. For example, the communication layer can include the JCEF Message protocol, the IPC protocol, and the WebSocket protocol, and can further include the JSON Remote Procedure Call (RPC) protocol, a local call protocol, etc. In the SDK, connection of communication channels is handled in a unified way, communication API interfaces and protocols are unified, and each SDK is bound to the communication API so as to eliminate a difference between integrated development environments. Communication and invoking cannot be directly performed between the interface layer, the service logic layer, and the application programming interface layer of the plug-in template, and need to be performed using the communication layer. The interface layer, the service logic layer, and the application programming interface layer are all communicatively connected to the communication layer. The communication and invoking between the interface layer and the service logic layer, and the communication and invoking between the service logic layer and the application programming interface layer are implemented using the communication layer.

The application programming interface code is pre-compiled in the application programming interface layer to perform unified API abstraction on the external APIs of the two platforms VSCode and JetBrains so as to eliminate a difference between integrated development environments, and provide a unified application programming interface corresponding to different services. As shown in FIG. 2, the application programming interface layer can specifically include a unified IDE API and a unified underlying API.

The communication layer and the application programming interface layer are pre-compiled or encapsulated in advance in the plug-in template such that the developer only needs to focus on completing the code related to the interface layer and the service logic layer. The interface layer can include interface code written using common development languages such as HTML+CSS+JS that are supported by each of the plurality of integrated development environments. The service logic layer can include service logic code written using a common development language such as JavaScript that is supported by each of the plurality of integrated development environments. After the obtained interface code and service logic code are filled into the corresponding interface layer and service logic layer, writing of the plug-in code of the service plug-in can be completed such that the plug-in template that includes the plug-in code is sent to any target integrated development environment in the plurality of integrated development environments for delivery.

After the service code is filled into the plug-in template to obtain the plug-in template that includes the plug-in code, the plug-in template can be compiled to obtain the service plug-in corresponding to the target integrated development environment. The process of compiling the plug-in template can include: compiling the plug-in template based on a compilation method corresponding to the target integrated development environment to obtain the service plug-in corresponding to the target integrated development environment. Then, the service plug-in can be sent to the target integrated development environment for loading, or the service plug-in can be uploaded to a plug-in market corresponding to the target integrated development environment, and users download the service plug-in based on their needs and load the service plug-in into the target integrated development environment.

There can be a variety of methods for compiling the plug-in template based on the compilation method corresponding to the target integrated development environment. The plug-in code in the plug-in template can be compiled using a compiler, a compilation tool, a command line tool, or the like provided by the target integrated development environment to obtain a service plug-in that is applicable to the target integrated development environment. Then, the service plug-in is loaded into the target integrated development environment to implement a related function of the service plug-in. For example, for the JetBrains integrated development environment, a compiler or a compilation tool provided by the JetBrains integrated development environment can be used to compile plug-in code in the plug-in template to obtain a service plug-in that is applicable to the JetBrains integrated development environment. For the VSCode integrated development environment, a compiler or a compilation tool provided by the VSCode integrated development environment can be used to compile plug-in code in the plug-in template to obtain a service plug-in that is applicable to the VSCode integrated development environment.

In the process of compiling the plug-in template based on the compilation method corresponding to the target integrated development environment, target execution code adapted to a running environment of the target integrated development environment can be selected from the pre-compiled execution code that is adapted to the running environments corresponding to the plurality of integrated development environments and that is included in the plug-in template. For the interface layer, the SDK of the communication protocol corresponding to the target integrated development environment can be selected from the communication protocol SDK bound to the communication API, and the SDK of another communication protocol can be further deleted. For the application programming interface layer, an API corresponding to the target integrated development environment can be selected from the unified IDE API and the unified underlying API, and other unrelated APIs can be further deleted.

After the plug-in template is compiled based on the compilation method corresponding to the target integrated development environment, a service plug-in corresponding to the target integrated development environment can be obtained, and the service plug-in is loaded into the target integrated development environment so as to implement a related function corresponding to the service plug-in in the target integrated development environment.

It can be understood from the technical solutions in some above-mentioned embodiments that, in some embodiments of this application, a plug-in template including pre-compiled execution code that is adapted to running environments corresponding to the plurality of integrated development environments is used such that when developing a service plug-in for a target integrated development environment, a developer only needs to write service code based on a common development language that is supported by each of the plurality of integrated development environments, and the developer only needs to send the plug-in template that is filled with service code to the target integrated development environment to load a service plug-in with a specific function in the target integrated development environment. The developer no longer needs to specifically develop plug-ins corresponding to different integrated development environments, thereby reducing repeated development, and reducing numerous development time costs and human resources.

Corresponding to some above-mentioned embodiments of the cross-platform plug-in development method, this application further provides some embodiments of a cross-platform plug-in development apparatus.

Figure 3:
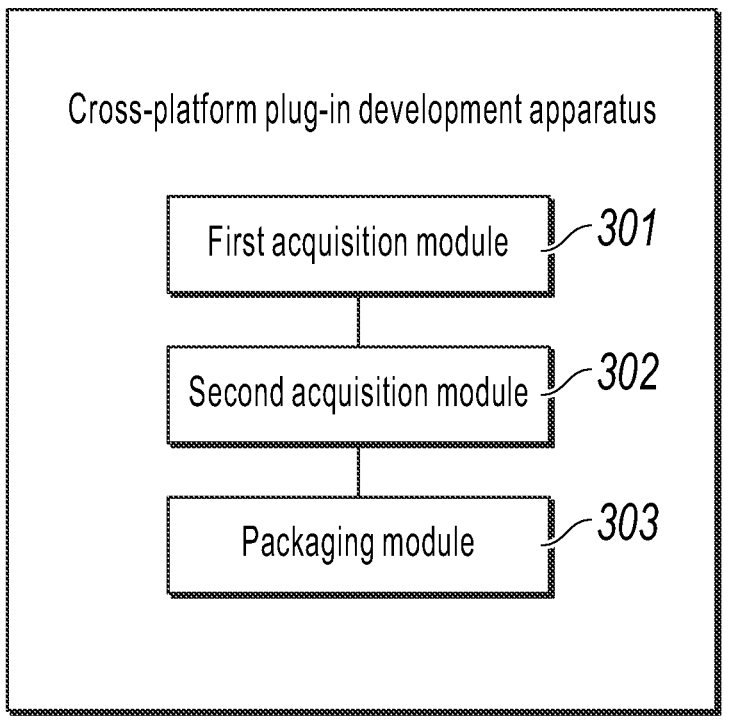
FIG. 3 is a schematic structural diagram illustrating a cross-platform plug-in development apparatus, according to some example embodiments of this application.

As shown in FIG. 3, the cross-platform plug-in development apparatus includes a first acquisition module 301, a second acquisition module 302, and a packaging module 303.

The first acquisition module 301 is configured to acquire a plug-in template corresponding to a plurality of integrated development environments, where the plug-in template includes pre-compiled execution code that is adapted to running environments corresponding to the plurality of integrated development environments. The second acquisition module 302 is configured to acquire service code related to a service corresponding to a service plug-in that is developed for any target integrated development environment in the plurality of integrated development environments based on the plug-in template, where the service code is code developed based on a common development language that is supported by each of the plurality of integrated development environments. The packaging module 303 is configured to: after the service code is filled into the plug-in template, compile the plug-in template to obtain the service plug-in corresponding to the target integrated development environment.

Optionally, the execution code includes communication code that supports a plurality of communication protocols corresponding to the running environments of the plurality of integrated development environments, and application programming interface code that supports an application programming interface corresponding to the running environments of the plurality of integrated development environments.

Optionally, the service code includes interface code that is adapted to an interaction interface corresponding to the plurality of integrated development environments, and service logic code that is used to invoke the application programming interface corresponding to the running environments of the plurality of integrated development environments.

Optionally, the plug-in template is a multi-layer architecture, which includes an interface layer, a service logic layer, a communication layer, and an application programming interface layer; the interface layer, the service logic layer, and the application programming interface layer are all communicatively connected to the communication layer, and the interface layer includes the interface code; the service logic layer includes the service logic code; the communication code is pre-compiled in the communication layer to provide an application programming interface that is respectively bound to communication software development kits of different communication protocols; and the application programming interface code is pre-compiled in the application programming interface layer to provide application programming interfaces corresponding to different services.

Optionally, the interface code is compiled using HTML, CSS, and JS languages.

Optionally, the service logic code is compiled using the JavaScript language.

Optionally, the packaging module 303 is configured to compile the plug-in template based on a compilation method corresponding to the target integrated development environment to obtain the service plug-in such that the target integrated development environment loads the service plug-in.

Optionally, the packaging module 303 is configured to select target execution code adapted to a running environment of the target integrated development environment from the pre-compiled execution code that is adapted to the running environments corresponding to the plurality of integrated development environments and that is included in the plug-in template.

Optionally, the plurality of integrated development environments include a JetBrains integrated development environment and a VSCode integrated development environment.

Optionally, the plug-in development program includes a service plug-in that runs on a plug-in development platform and that is configured to provide a plug-in development service for the plurality of integrated development environments.

It can be understood from the technical solutions in some above-mentioned embodiments that, in some embodiments of this application, a plug-in template including pre-compiled execution code that is adapted to running environments corresponding to the plurality of integrated development environments is used such that when developing a service plug-in for a target integrated development environment, a developer only needs to write service code based on a common development language that is supported by each of the plurality of integrated development environments, and the developer only needs to send the plug-in template that is filled with service code to the target integrated development environment to load a service plug-in with a specific function in the target integrated development environment. The developer no longer needs to specifically develop plug-ins corresponding to different integrated development environments, thereby reducing repeated development, and reducing numerous development time costs and human resources.

Figure 4:
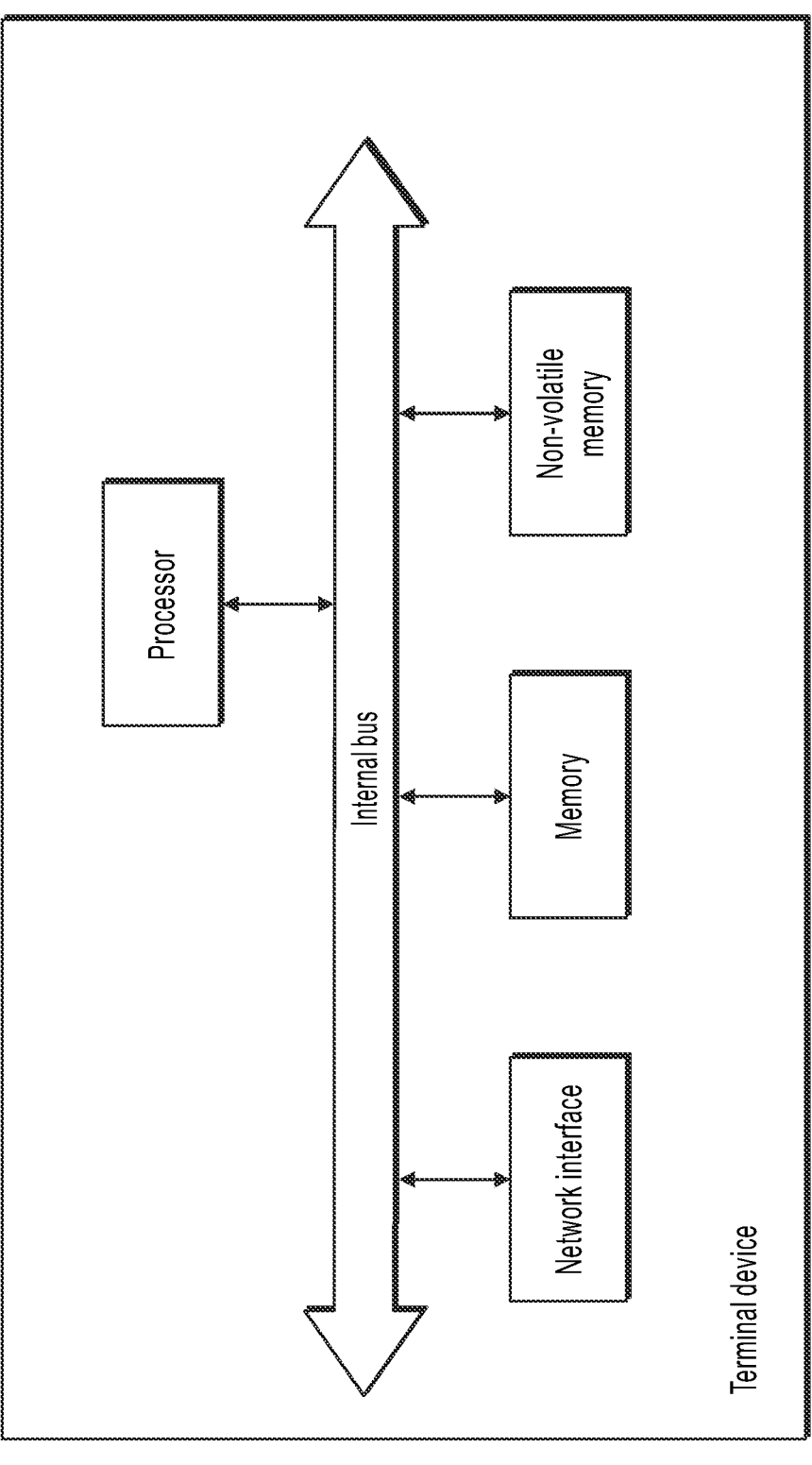
FIG. 4 is a schematic structural diagram illustrating an electronic device, according to some example embodiments of this application.

Some embodiments of the cross-platform plug-in development apparatus in this application can be applied to an electronic device. Some apparatus embodiments can be implemented by software, or can be implemented by hardware or a combination of software and hardware. For example, the apparatus embodiments are implemented by software. A logical apparatus is formed when a processor of an electronic device in which the apparatus is located reads a corresponding computer program instruction in a non-volatile memory into a memory for running. In terms of hardware, FIG. 4 is a diagram illustrating a hardware structure of an electronic device in which the cross-platform plug-in development apparatus in this application is located. In addition to the processor, memory, network interface, and non-volatile memory shown in FIG. 4, the electronic device in which the apparatus is located in some embodiments generally can further include other hardware based on an actual function of the electronic device. Details are omitted here for simplicity.

For an implementation process of functions and roles of each unit in the apparatus, references can be made to an implementation process of corresponding steps in the above-mentioned method. Details are omitted here for simplicity.

Since some apparatus embodiments basically correspond to some method embodiments, for related parts, references can be made to related descriptions in the method embodiments. Some apparatus embodiments described above are merely examples. The units described as separate parts can be or do not have to be physically separate, and parts displayed as units can be or do not have to be physical units, that is, can be located in one position, or can be distributed on a plurality of network units. Some or all of the modules can be selected based on actual needs to implement the objectives of the solutions of this application. A person of ordinary skill in the art can understand and implement the solutions without creative efforts.

Some embodiments of this application further provide a computer-readable storage medium, where the computer-readable storage medium stores a computer program, and the program is executed by a processor to implement the steps of the above-mentioned cross-platform plug-in development method, and can achieve the same technical effect. To avoid repetition, details are omitted here for simplicity.

It is worthwhile to note that the user information (including but not limited to user equipment information, user personal information, etc.) and the data (including but not limited to data used for analysis, stored data, displayed data, etc.) used in this application are information and data that are authorized by users or that are fully authorized by all parties, and the related data need to be collected, used, and processed in compliance with relevant laws, regulations, and standards of relevant countries and regions, and corresponding operation entries are provided for users to choose to authorize or reject.

Some embodiments of the subject matters and function operations described in this specification can be implemented in the following: a digital electronic circuit, tangible computer software or firmware, computer hardware including a structure disclosed in this specification and structural equivalents thereof, or a combination of one or more of them. Some embodiments of the subject matters described in this specification can be implemented as one or more computer programs, i.e., one or more modules in computer program instructions that are encoded on a tangible non-transitory program carrier to be executed by a data processing apparatus or to control an operation of the data processing apparatus. Alternatively or additionally, program instructions can be encoded on an artificially generated propagation signal, such as an electrical, optical, or electro-magnetic signal generated by a machine, and the signal is generated to encode and transmit information to an appropriate receiver apparatus for execution by the data processing apparatus. The computer storage medium can be a machine-readable storage device, a machine-readable storage substrate, a random or serial access memory device, or a combination of one or more of them.

The processing and logic procedures described in this specification can be executed by one or more programmable computers that execute one or more computer programs, so as to perform corresponding functions by performing operations based on input data and generating output. The processing and logic procedures can alternatively be executed by a dedicated logic circuit, such as a field-programmable gate array (FPGA) or an application-specific integrated circuit (ASIC), and the apparatus can also be implemented as a dedicated logic circuit.

Computers suitable for executing computer programs include, for example, general-purpose and/or dedicated microprocessors, or any other type of central processing unit. Generally, the central processing unit receives instructions and data from the read-only memory and/or the random access memory. Basic components of the computer include the central processing unit configured to implement or execute instructions and one or more memory devices configured to store instructions and data. Generally, the computer further includes one or more mass storage devices for storing data, such as a magnetic disk, a magneto-optical disk, or an optical disc, or the computer is operably coupled to the mass storage device to receive data from or transmit data to the mass storage device, or both of the two cases exist. However, the computer does not have to include such a device. In addition, the computer can be embedded into another device, for example, a mobile phone, a personal digital assistant (PDA), a mobile audio or video player, a game console, a global positioning system (GPS) receiver, or a portable storage device such as a universal serial bus (USB) flash drive.

The computer-readable medium suitable for storing computer program instructions and data includes all forms of non-volatile memories, media, and memory devices, including, for example, a semiconductor memory device (such as an EPROM, an EEPROM, and a flash memory device), a magnetic disk (such as an internal hard disk or a removable disk), a magneto-optical disk, a CD ROM, and a DVD-ROM. The processor and the memory can be supplemented by the dedicated logic circuit or incorporated into the dedicated logic circuit.

Although this specification includes many specific implementation details, these details should not be construed as limiting the scope of any invention or the scope of the claimed protection, but are mainly intended to describe features of some specific embodiments of a particular invention. Some features described in a plurality of embodiments in this specification can alternatively be implemented in combination in a single embodiment. In addition, the features described in a single embodiment can alternatively be implemented respectively in a plurality of embodiments, or implemented in any appropriate sub-combination. In addition, although the features can take effect in some combinations and even initially claim protection as such, as described above, one or more features in the combinations sought to be protected can be removed from the combinations in some cases, and the combinations sought to be protected can point to sub-combinations or variants of the sub-combinations.

Similarly, although operations are depicted in a particular order in the accompanying drawings, it should not be understood as requiring these operations to be performed in the particular order shown, or performed successively, or requiring all illustrative operations to be performed to achieve the desired results. In some cases, multi-tasking and concurrent processing may be advantageous. In addition, separation of the system modules and components in some embodiments described above should not be understood as requiring such separation in all embodiments, and it should be understood that the described program components and systems can usually be integrated together in a single software product or encapsulated into a plurality of software products.

Therefore, some specific embodiments of the subject matters have been described. Other embodiments fall within the scope of the appended claims. In some cases, the actions described in the claims can be performed in different orders and can still achieve the desired results. In addition, the processing depicted in the accompanying drawings is not necessarily performed in the particular order shown, or performed successively to achieve the desired results. In some implementations, multi-tasking and concurrent processing may be advantageous.

The above-mentioned descriptions are merely example embodiments of this application, but are not intended to limit this application. Any modification, equivalent replacement, improvement, or the like made without departing from the spirit and principle of this application shall fall within the protection scope of this application.

What is claimed is:

1. A computer-implemented method for cross-platform plug-in development, comprising:
using a plug-in development program:
    acquiring a plug-in template corresponding to a plurality of integrated development environments, wherein the plug-in template comprises pre-compiled execution code adapted to running environments corresponding to the plurality of integrated development environments, wherein the pre-compiled execution code comprises communication code and application programming interface code;

acquiring service code related to a service corresponding to a service plug-in developed for a target integrated development environment based on the plug-in template, wherein the service code is code developed based on a common development language supported by each of the plurality of integrated development environments, wherein the service code comprises interface code and service logic code; and after the service code is filled into the plug-in template, compiling the plug-in template to obtain the service plug-in corresponding to the target integrated development environment, wherein the plug-in template is a multi-layer architecture, which comprises an interface layer, a service logic layer, a communication layer, and an application programming interface layer;

wherein the interface layer, the service logic layer, and the application programming interface layer are all communicatively connected to the communication layer, and the interface layer comprises the interface code;

wherein the service logic layer comprises the service logic code;

wherein the communication code is pre-compiled in the communication layer to provide application programming interfaces respectively bound to communication software development kits of different communication protocols; and wherein the application programming interface code is pre-compiled in the application programming interface layer to provide application programming interfaces corresponding to different services.

2. The computer-implemented method of claim 1, wherein the communication code comprises communication code of a plurality of communication protocols which corresponds to the running environments and the application programming interface code supports application programming interfaces which correspond respectively to the running environments.

3. The computer-implemented method of claim 2, wherein the interface code comprises interface code adapted to interaction interfaces corresponding respectively to the plurality of integrated development environments and the service logic code is used to invoke the application programming interfaces which correspond respectively to the running environments.

4. The computer-implemented method of claim 3, wherein the interface code is compiled using HTML, CSS, and JS languages.

5. The computer-implemented method of claim 1, wherein the compiling the plug-in template to obtain the service plug-in corresponding to the target integrated development environment, comprises:

compiling the plug-in template based on a compilation method corresponding to the target integrated development environment to obtain the service plug-in corresponding to the target integrated development environment.

6. The computer-implemented method of claim 5, wherein the compiling the plug-in template based on a compilation method corresponding to the target integrated development environment, comprises:

selecting target execution code adapted to a running environment of the target integrated development environment from the pre-compiled execution code adapted to the running environments corresponding to the plurality of integrated development environments and comprised in the plug-in template.

7. The computer-implemented method of claim 1, wherein the plurality of integrated development environments comprise a JetBrains integrated development environment and a VSCode integrated development environment.

8. The computer-implemented method of claim 1, wherein:

the plug-in development program is used to develop plug-ins for a plurality of supported integrated development environments that have different running environments; and the plug-in development program comprises a service plug-in that runs on a plug-in development platform and is configured to provide a plug-in development service for the plurality of supported integrated development environments.

9. A non-transitory, computer-readable medium storing one or more instructions executable by a computer system to perform one or more operations for cross-platform plug-in development, comprising:

using a plug-in development program:

acquiring a plug-in template corresponding to a plurality of integrated development environments, wherein the plug-in template comprises pre-compiled execution code adapted to running environments corresponding to the plurality of integrated development environments, wherein the pre-compiled execution code comprises communication code and application programming interface code;

acquiring service code related to a service corresponding to a service plug-in developed for a target integrated development environment based on the plug-in template, wherein the service code is code developed based on a common development language supported by each of the plurality of integrated development environments, wherein the service code comprises interface code and service logic code; and after the service code is filled into the plug-in template, compiling the plug-in template to obtain the service plug-in corresponding to the target integrated development environment, wherein the plug-in template is a multi-layer architecture, which comprises an interface layer, a service logic layer, a communication layer, and an application programming interface layer;

wherein the interface layer, the service logic layer, and the application programming interface layer are all communicatively connected to the communication layer, and the interface layer comprises the interface code;

wherein the service logic layer comprises the service logic code;

wherein the communication code is pre-compiled in the communication layer to provide application programming interfaces respectively bound to communication software development kits of different communication protocols; and wherein the application programming interface code is pre-compiled in the application programming interface layer to provide application programming interfaces corresponding to different services.

10. The non-transitory, computer-readable medium of claim 9, wherein the communication code comprises communication code of a plurality of communication protocols which corresponds to the running environments and the application programming interface code supports application programming interfaces which correspond respectively to the running environments.

11. The non-transitory, computer-readable medium of claim 10, wherein the interface code comprises interface code adapted to interaction interfaces corresponding respectively to the plurality of integrated development environments and the service logic code is used to invoke the application programming interfaces which correspond respectively to the running environments.

12. The non-transitory, computer-readable medium of claim 11, wherein the interface code is compiled using HTML, CSS, and JS languages.

13. The non-transitory, computer-readable medium of claim 9, wherein the compiling the plug-in template to obtain the service plug-in corresponding to the target integrated development environment, comprises:

compiling the plug-in template based on a compilation method corresponding to the target integrated development environment to obtain the service plug-in corresponding to the target integrated development environment.

14. The non-transitory, computer-readable medium of claim 13, wherein the compiling the plug-in template based on a compilation method corresponding to the target integrated development environment, comprises:

selecting target execution code adapted to a running environment of the target integrated development environment from the pre-compiled execution code adapted to the running environments corresponding to the plurality of integrated development environments and comprised in the plug-in template.

15. The non-transitory, computer-readable medium of claim 9, wherein the plurality of integrated development environments comprise a JetBrains integrated development environment and a VSCode integrated development environment.

16. The non-transitory, computer-readable medium of claim 9, wherein:

the plug-in development program is used to develop plug-ins for a plurality of supported integrated development environments that have different running environments; and the plug-in development program comprises a service plug-in that runs on a plug-in development platform and is configured to provide a plug-in development service for the plurality of supported integrated development environments.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for cross-platform plug-in development, comprising:

using a plug-in development program:

acquiring a plug-in template corresponding to a plurality of integrated development environments, wherein the plug-in template comprises pre-compiled execution code adapted to running environments corresponding to the plurality of integrated development environments, wherein the pre-compiled execution code comprises communication code and application programming interface code;

acquiring service code related to a service corresponding to a service plug-in developed for a target integrated development environment based on the plug-in template, wherein the service code is code developed based on a common development language supported by each of the plurality of integrated development environments, wherein the service code comprises interface code and service logic code; and after the service code is filled into the plug-in template, compiling the plug-in template to obtain the service plug-in corresponding to the target integrated development environment, wherein the plug-in template is a multi-layer architecture, which comprises an interface layer, a service logic layer, a communication layer, and an application programming interface layer;

wherein the interface layer, the service logic layer, and the application programming interface layer are all communicatively connected to the communication layer, and the interface layer comprises the interface code;

wherein the service logic layer comprises the service logic code;

wherein the communication code is pre-compiled in the communication layer to provide application programming interfaces respectively bound to communication software development kits of different communication protocols; and wherein the application programming interface code is pre-compiled in the application programming interface layer to provide application programming interfaces corresponding to different services.

18. The computer-implemented system of claim 17, wherein the communication code comprises communication code of a plurality of communication protocols which corresponds to the running environments and the application programming interface code supports application programming interfaces which correspond respectively to the running environments.

\* \* \* \* \*